United States Patent [19]

Yong et al.

[11] Patent Number: 5,541,919
[45] Date of Patent: Jul. 30, 1996

[54] MULTIMEDIA MULTIPLEXING DEVICE AND METHOD USING DYNAMIC PACKET SEGMENTATION

[75] Inventors: Mei Yong, Canton; Jian Yang, Norwood; Dennis Ng, Northboro, all of Mass.

[73] Assignee: Motorola, Inc., Schaumburg, Ill.

[21] Appl. No.: 358,427

[22] Filed: Dec. 19, 1994

[51] Int. Cl.$^6$ .............................. H04J 3/16; H04L 12/54
[52] U.S. Cl. ................................ 370/61; 370/82; 370/84; 370/85.6; 370/94.1; 370/112
[58] Field of Search ....................... 370/56, 58.1, 58.2, 370/58.3, 60, 60.1, 61, 79, 82, 84, 85.6, 85.7, 94.1, 94.2, 95.1, 110.1, 112, 118; 395/153, 154, 250, 500, 800; 340/825.5, 825.51, 825.52

[56] References Cited

U.S. PATENT DOCUMENTS

| | | | |
|---|---|---|---|
| 5,132,966 | 7/1992 | Hayano et al. | 370/79 |
| 5,140,584 | 8/1992 | Suzuki | 370/85.6 |
| 5,164,938 | 11/1992 | Jurkevich et al. | 370/60 |
| 5,229,992 | 7/1993 | Jurkevich et al. | 370/82 |
| 5,251,209 | 10/1993 | Jurkevich et al. | 370/82 |
| 5,268,900 | 12/1993 | Hluchjj et al. | 370/85.6 |
| 5,367,643 | 11/1994 | Chang et al. | 370/60 |

*Primary Examiner*—Alpus H. Hsu
*Attorney, Agent, or Firm*—Darleen J. Stockley

[57] ABSTRACT

The present invention provides a method (900) and device (100) in multimedia communication systems for efficiently segmenting information bitstreams from multiple media sources into variable length packets, and multiplexing and sending the packets to a shared communication link with low delay and low overhead. The packet segmentation and multiplexing are performed dynamically based on fullness of a set of information buffers that contain the information bitstreams to be transmitted, and delay-sensitivity of each information bitstreams. The multi-discipline queuing scheme has been developed in this invention to control the dynamic packet segmenting and multiplexing process.

37 Claims, 5 Drawing Sheets

MULTIMEDIA MULTIPLEXING DEVICE AND METHOD USING DYNAMIC PACKET SEGMENTATION

FIELD OF INVENTION

This invention relates generally to multimedia communications and more particularly to multimedia multiplexing.

BACKGROUND

Recent advances in telecommunications and Digital Signal Processing (DSP), technologies, have created a growing demand for multimedia communication products for both business and home use. Multimedia communications often involve the simultaneous transmission of audio, video and data, such as graphics, fax or computer data, through an available shared communication link. To make efficient use of the available communication link, a number of techniques are required. For example, compression algorithms for compressing various media types are needed to reduce the bandwidth needed to transmit them. In addition, an efficient and flexible multiplexing method is needed to provide an acceptable quality of service, i.e., low multiplexing overhead and queuing delay, for each media type.

In traditional circuit-switched networks, different signals are multiplexed together using time division multiplexing (TDM). In TDM, a fixed bandwidth is typically allocated to each media for the duration of a call, and there is little flexibility to take advantage of the bursty nature of data, video and audio information.

To gain more flexibility and efficiency, packet multiplexing techniques have been proposed. Packet multiplexing has been widely adopted in ATM networks. In packet multiplexing, each information bitstream is segmented into packets, and packets from different bitstreams are multiplexed and sequentially transmitted over a communication channel. Each packet typically contains a header field and a payload field. A packet header contains a packet identifier which is used for recovering each individual information bitstream from a multiplexed packet sequence. The payload field of a packet may optionally contain some media-specific adaptation information in addition to actual information bits. Packets may be of fixed-length or of variable-length. Fixed-length packets used in ATM have the following advantages: fast segmentation and reassembly, no need for delineation flags, and easy synchronization. However, fixed-size packets are not suitable for use on low-speed links, because of efficiency and delay considerations. Variable-length packets simplify the implementation of the adaptation layers and allow a flexible design to trade-off delay against efficiency. Thus, variable-length packets are more appealing for use on low-speed links such as voiceband modem links.

When variable-length packets are used, flags are inserted between packets for delineation and synchronization. A widely used variable-length packet format is the HDLC-based framing structure, where HDLC represents High-level Data Link Control. In the HDLC format, the packet delineation flag, called the HDLC flag, is a one-byte binary word: "01111110". To avoid duplication of the HDLC flag in the information bitstream, HDLC bit stuffing is applied to the content of a packet between two flags by inserting a "0" bit after every five contiguous "1" bits. Overhead caused by HDLC bit-stuffing of a random bitstream is approximately 1.6%, but can be as high as 20% in the worst case. Another use of the HDLC flag is in bit-rate adaptation. When the aggregate bit rate is less than the channel rate, the HDLC flag can be repetitively sent during channel idle periods.

The effectiveness of a packet multiplexing scheme typically depends on its efficiency and delay. Efficiency is obtained by reducing packet overhead and by maximizing the bandwidth utilization. Increasing the packet size reduces the effective packet overhead, but increases the queuing delay. Thus, there is a need for a device and method that can achieve a good trade-off between efficiency and delay in a multimedia communication system

DETAILED DESCRIPTION OF THE INVENTION

The present invention provides a device and method for a multimedia communication system in which multiple information bitstreams are prioritized and dynamically segmented into variable-length packets, and multiplexed for efficient transmission over a digital communication link.

Figure 1:
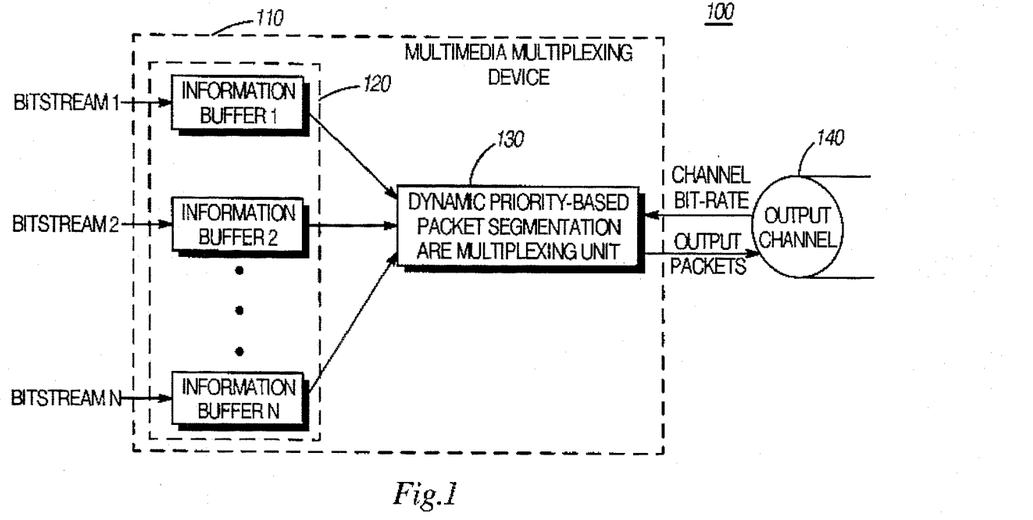
FIG. 1 is a block diagram showing one embodiment of a multimedia multiplexing device in accordance with the present invention.

FIG. 1, numeral 100, is a block diagram schematic of one embodiment of a multimedia multiplexing device in accordance with the present invention. The multimedia multiplexing device (110) includes a plurality of information buffers (120) for receiving bitstreams from different information sources, and a dynamic priority-based packet segmentation and multiplexing unit having a multi-discipline queuing scheme (130), that is operably coupled to the set of information buffers (120) and to an output channel (140) for segmenting and multiplexing the received bitstreams into variable length packets and sending these packets to an output channel.

Figure 2:
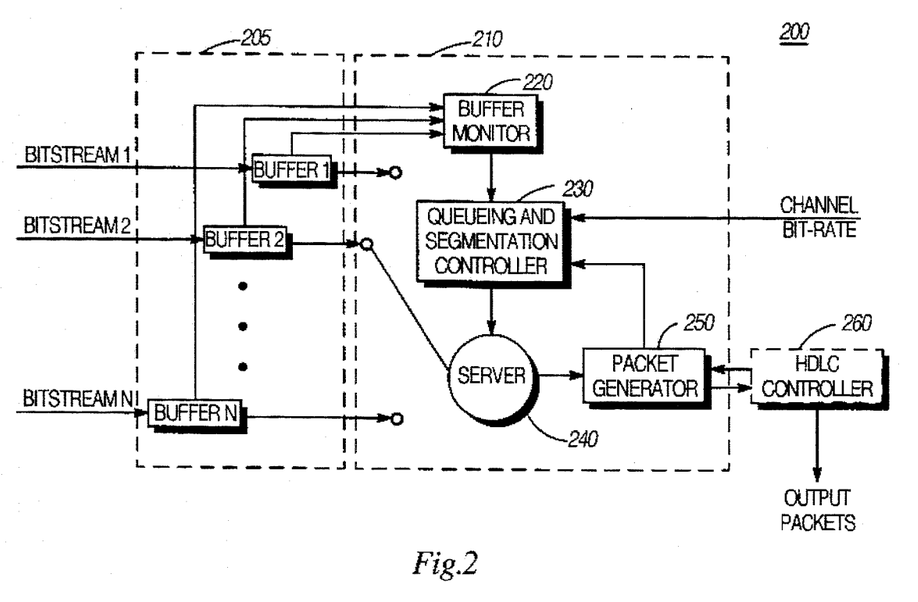
FIG. 2 is a block diagram showing the multimedia multiplexing device of FIG. 1 with greater particularity.

FIG. 2, numeral 200, is a more detailed block diagram of one embodiment of the dynamic priority-based packet segmentation and multiplexing unit having a multi-discipline queuing scheme (130) and its relation to the set of information buffers (120) of FIG. 1. The dynamic priority-based packet segmenting and multiplexing unit (210) includes: a buffer monitor (220) that is operably coupled to a set of information buffers (205), for monitoring the fullness of each information buffer and sending a packet-transmission request to a queuing and segmentation controller (230) when an information buffer has one packet worth of information bits ready to be sent; a queuing and segmentation controller (230), that is operably coupled to receive packet-transmission request(s) from the buffer monitor (220), to receive channel bit-rate information for an output channel, and to receive an end of packet indication from a packet generator (250), for modifying a service buffer of a server (240) in accordance with a selected queuing discipline; a server (240) that is operably coupled to receive a command from the queuing and segmentation controller (230), and operably coupled with the set of information buffers, for receiving a bitstream from a selected information buffer and passing the selected bitstream to a packet generator (250); and a packet generator (250), that is operably coupled to receive a bitstream from the server (240), for forming packets, sending packets to an output channel, and informing the queuing and segmentation controller (230) each time a packet is sent. Where selected, flags and stuffing bits for a packet may be generated by a hardware HDLC controller (260) that is operably coupled to the packet generator (250).

There are two main aspects of the device and method of the present invention: A) it dynamically adjusts packet sizes based on the fullness of the information buffers and available bit-rate of the output channel; B) it multiplexes packets in an order based on a predetermined queuing discipline which gives higher priority to delay-sensitive source(s) and allows effective bandwidth sharing among different sources. In the following, the detailed description of the algorithm and an implementation in accordance with this invention are provided.

First, bitstreams from different sources are prioritized based on their delay tolerances, where a bitstream that can tolerate the least delay, for example, real-time traffic, is given the highest priority, a bitstream that can tolerate the most delay, for example, non-real-time traffic, is given the lowest priority, and bitstreams that have an equal delay tolerance are given the same priority. Furthermore, the bitstreams having an equal priority are grouped into a single priority group. Each priority group may contain one or more bitstreams.

A bandwidth-weighting factor for bitstream i, denoted as $a_i$, is defined as a fraction of bandwidth allocated to the bitstream i out of the total bandwidth allocated to the priority group containing bitstream i. If there is only one source in a priority group, then $a_i=1$.

Two often used queuing disciplines, known in the art, for packet multiplexing are called Head-Of-Line-Priority (HOLP) and Weighted-Round-Robin (WRR). Where there are N buffers, represented as $B_1, B_2, \ldots,$ and $B_N$, for storing source bitstream $1, 2, \ldots,$ and N respectively, the priority of each buffer is the same as the priority of the corresponding bitstream. Also, priorities of buffers are $P_1, P_2, \ldots,$ and $P_N$, with $P_1 > P_2 > \ldots, P_N$. These buffers are served (where serving a buffer means taking bits out of a buffer and sending them to an output port) according to a predetermined queuing discipline. Where the predetermined queuing discipline is HOLP, every time the server finds the channel ready to accept a packet, it examines $B_1$ first, $B_2$ next and so on until it finds a packet. Where the predetermined queuing discipline is WRR, the server serves the buffers cyclically in a predetermined order. In any such repetitive cycle, it examines each buffer a specified number of times in proportion to its weight.

There is a key difference between the present invention and multiplexing using a HOLP or WRR queuing discipline. In the HOLP or WRR queuing discipline, the priority and bandwidth allocation to different information sources are guaranteed by serving each specified buffer either more or less frequently, but there is no improvement to packetization efficiency. Using the present invention, priority and bandwidth allocation are achieved by dynamically adjusting packet size. This method not only achieves efficient bandwidth sharing and guarantees low delay to high priority bitstreams, but also optimizes packet size to minimize packetization overhead.

In the present invention, two different queuing disciplines are defined and used for variable length packet (VLP) segmentation, referred as the HOLP-VLP and the WRR-VLP.

The HOLP-VLP queuing discipline of the present invention is used to treat sources or priority groups which all have different priorities. The HOLP-VLP queuing discipline includes the steps described below. Where buffer i, i an index of a buffer, is currently being served, a server continues to serve buffer i until one of the following two events happens: a) at least one packet from a higher priority buffer is ready to be sent; b) there are not enough bits in buffer i to form a packet. When either of the above two events happens, the server stops serving the current buffer as soon as possible and then switches to serve the next buffer which has the highest priority among all the buffers that have packets ready to be sent, where said "as soon as possible" means that the server needs to complete sending the packet currently being sent before making a switch. The length of a packet from a buffer is upper-bounded by a maximum number of bits which can be sent during the time when said buffer is being continuously served. The detailed determination of a packet length is given in EQ.1 and EQ.2 below.

Figure 3:
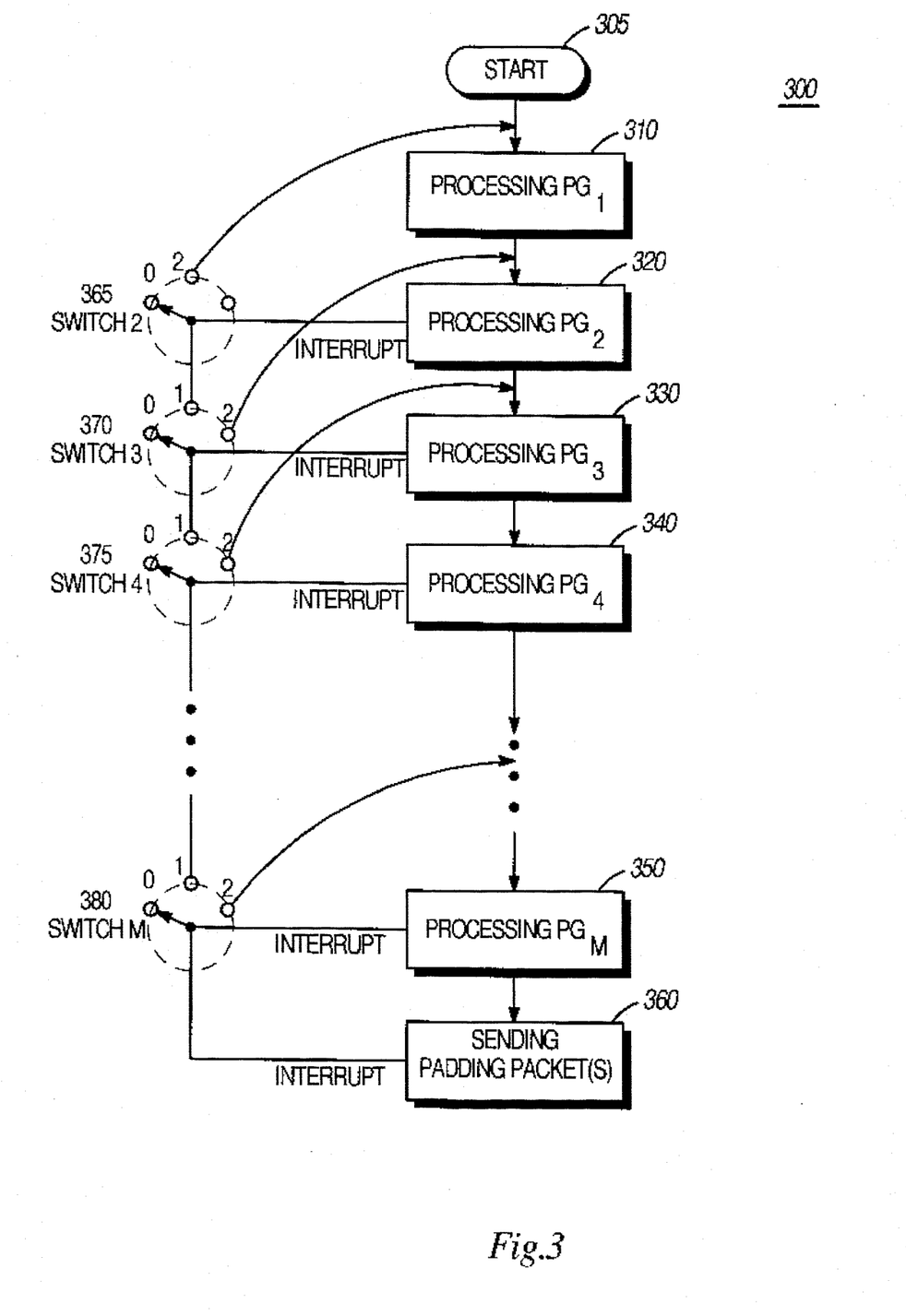
FIG. 3 is a flow chart showing the processes and control flow for multiplexing different priority groups according to the Head of Line Priority for Variable Length Packet (HOLP-VLP) queuing discipline.

FIG. 3, numeral 300, is a flow chart showing the processes and control flow for multiplexing M, where M is an integer greater than 1, different priority groups according to the HOLP-VLP queuing discipline. In FIG. 3, $PG_i$ is the an abbreviation for Priority Group i for $i=1, 2, \ldots, M$, and the priority of $PG_1$ is higher than that of $PG_2$, the priority of $PG_2$ is higher than that of $PG_3$, and so on. In this process, packets currently in $PG_1$ (310) are sent first, packets in $PG_2$ (320) are then sent if no packet in $PG_1$ is ready to be sent, and so on. If there is no packet in all PGs, the process of sending padding packet(s) (360) is executed until said process is interrupted by a packet-transmission request, where any PG sends a packet-transmission request as soon as it has a packet ready to be sent. Any process of sending a particular PG can be interrupted by a packet-transmission request of any higher priority PG, but not by a lower priority PG. Where such an interrupt occurs, the current process is terminated promptly, and then the next process, determined by the positions of a plurality of switches (365, 370, 375, . . . , 380), is started. Where $PG_1$ sends a packet-transmission request, switch 2 (365) switches to location 1; otherwise, switch 2 moves to location 0. Switch i, where i>2, functions as follows: where at least one of the switches above it (i.e., switch 2, . . . , switch i–1) is either in position 1 or position 2, switch i moves to location 1; otherwise where $PG_{i-1}$ sends a packet-transmission request, switch i moves to location 2; otherwise switch i moves to location 0. Where a switch is positioned at 1 for $PG_2$, an interrupt of $PG_2$, an interrupt of $PG_2$ immediately starts processing of $PG_1$. Where a switch is positioned at 1 for $PG_i$, i>2, an interrupt of $PG_i$ immediately starts processing $PG_{n-1}$, where n an integer less than i, and is determined by positions of switches 0 to i−1. Where a switch i is set to 2, $PG_{i-1}$ is processed. Where a switch is set to 1, an interrupt of $PG_i$ starts a next process $PG_{n-1}$, n an integer less than i, where switch n is set to 2. Where switch i is set to 0 for $PG_i$, no prior $PG_{1->i-1}$ is processed.

The WRR-VLP queuing discipline of the present invention is used to treat multiple sources within the same priority group. The WRR-VLP queuing discipline functions as follows: In a pre-selected partition period, referred as $T_p$, the m serves each buffer in the same priority group cyclically in a predetermined order and for a period, referred as $T_i$ (where i is the index of the buffer). The period $T_i$ is determined as the following. Normally, $T_i$ is taken to be $a_i*T_p$, where $a_i$ is the bandwidth-weighting factor used for source i. However, $T_i$ may be shortened if the buffer i has no more bits to be sent or if a packet from a higher priority buffer is ready to be sent, or it can be extended if buffer i still has bits to be sent, but all other buffers in the same priority group have no bits to be sent. The upper bound of the partition period $T_p$ is determined by the maximum queuing delay requirement for each bitstream in this priority group and the lower bound of $T_p$ is determined by the packetization efficiency requirement. $T_p$ may also be adjusted dynamically. If a particular buffer is allocated a period of $a_i*T_p$ to send a packet, but this packet is interrupted by a packet-transmission request from a higher priority buffer, then the remaining credit is typically given to the same buffer when this priority group is served again in the following time. The length of a packet from a buffer is upper bounded by the maximum number of bits which can be sent during the time when said buffer is being continuously served. The detailed determination of a packet length is given in EQ.1 and EQ.3 of section 4.4.

Figure 4:
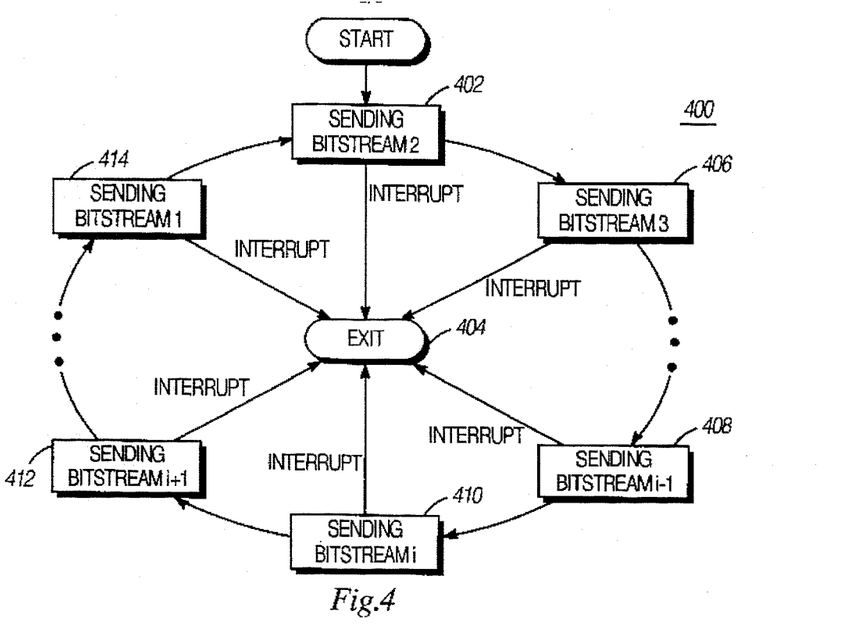
FIG. 4 is a flow chart showing the processes and control flow for multiplexing different bitstreams in the same priority group according to the Weighted Round Robin for Variable Length Packet (WRR-VLP) queuing discipline.

FIG. 4, numeral 400, is a flow chart showing the processes and control flow for multiplexing bitstreams within a priority group according to the WRR-VLP queuing discipline. In FIG. 4, a set of individual processes are connected as a ring. These processes are executed cyclically in a predetermined order, as shown by the arrows. For example, the process may include:

--- sending Bitstream 2 (402) followed by:
interruption and Exit (404), or
sending Bitstream 3 (406),
followed by:
interruption and Exit (404), or
sending Bitstream i−n, n a positive integer,
.
.
.
followed by:
interruption and Exit (404), or
sending Bitstream i−1 (408),
followed by:
interruption and Exit (404), or
sending Bitstream i (410),
followed by:
interruption and Exit (404), or
sending Bitstream i + 1 (412),
.
.
.
followed by:
interruption and Exit (404), or
sending Bitstream 1 (414),
followed by:
interruption and Exit (404), or
return to sending Bitstream 2 (402) and
continuing as described above.

---

At the beginning of a communication, the first process to start with can be any one of the processes as set forth above, e.g., the process that has a packet ready first. After a first process is started, each time when the priority group of the first process is being processed, the first bitstream to be sent depends on where the previous execution of this priority group exits. Any of these individual processes can be terminated if a packet-transmission request is received from a higher priority group or if there are no more packets ready to be sent in this priority group. When a process is interrupted or there are no more packets to be sent in the priority group, processing of the priority group exits.

The two queuing disciplines described above may be combined to obtain different hybrid queuing disciplines based on the need of applications. One example of applying these two queuing disciplines to multiplexing multimedia bitstreams is shown in FIG. 5.

Figure 5:
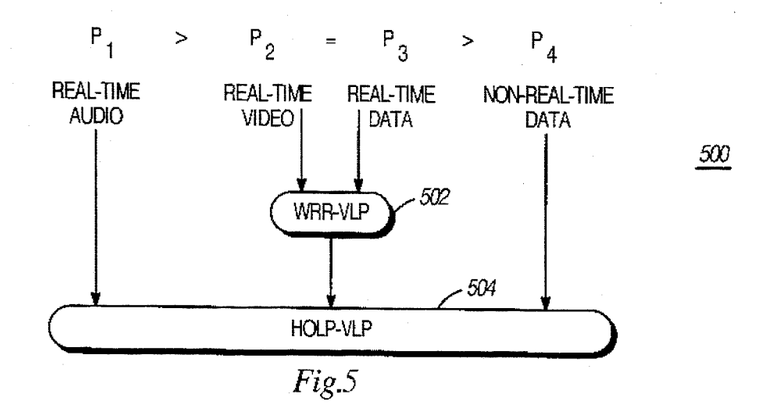
FIG. 5 is shows an example of one embodiment of steps wherein a hybrid queuing discipline is applied to multimedia bitstreams in accordance with the present invention.

In the example of FIG. 5, four bitstreams, a real-time audio (bitstream 1), a real-time video (bitstream 2), a real-time data (bitstream 3) and a non-real-time data (bitstream 4) are multiplexed together. The priority assignments to these four bitstreams are $P_1>P_2=P_3>P_4$, where $P_i$ is the priority associated with bitstream i. Since bitstream 2 and 3 are in the same priority group, they are multiplexed according to the WRR-VLP in multiplexer WRR-VLP (502). Since bitstream 1 has higher priority than the priority group containing bitstreams 2 and 3, which has higher priority than bitstream 4, thus these three priority groups are multiplexed according to the HOLP-VLP in multiplexer HOLP-VLP (504).

Let $S_i(t)$ represent the number of raw information bits in a packet, i.e., excluding packet header, flags and any stuffing bits, taken from buffer i and generated at time t, where $S_i(t)$ is chosen to be:

$$\text{if } (Q_i(t) < S_i^{min}) \qquad \text{(EQ 1)}$$
$$S_i(t) = 0$$
$$\text{else}$$
$$S_i(t) = \min\{S_i^{max}, Q_i(t) + Q_i(t_{itp} - t), B_i(t,t_{itp})\}$$

where $S_i^{min}$ and $S_i^{max}$, with $0<S_i^{min}<=S_i^{max}$, are respectively the minimum and maximum number of raw information bits in a packet for source i, and they are typically pre-determined based on efficiency and memory requirements for a given application, $Q_i(t)$ the number of raw information bits available in buffer i at time t, $Q_i(t_{itp}-t)$ the number of raw information bits entering buffer i between time t and $t_{itp}$, and $B_i(t,t_{itp})$ the estimated bandwidth (in terms of number of bits) available for the current bitstream between t and $t_{itp}$, where $t_{itp}$ is the interrupt time at which transmission of the current packet must be stopped. If it is desired to send a fixed number of information bits in each packet, then $S_i^{min}=S_i^{max}$.

The value of $t_{itp}$ and $B_i(t,t_{itp})$ are estimated differently for different queueing disciplines. Where the HOLP-VLP queuing discipline is used, then $t_{itp}=t_h$, where $t_h$ is the interrupt time at which at least one of higher priority buffers than buffer i has a packet ready to be send, and $$B_i(t,t_{itp})=R*(t_h-t)-O_i(t) \qquad \text{(EQ 2)}$$

where R is the bit-rate of the output channel, and $O_i(t)$ is the estimated overhead bits (such as packet delineation flag, packet header and stuffing bits) added to this packet. The time $t_h$ may be predicted where said higher priority bitstreams are produced at constant bit-rates; otherwise it occurs randomly. In principle, predicting $t_h$ in advance is unnecessary since a packet can be terminated promptly as soon as a packet from a higher priority buffer is ready to be sent. However, knowing $t_h$ in advance simplifies implementation.

Where the WRR-VLP queuing discipline is used, then $$B_i(t,t_{itp})=\min\{\max\{a_i*R*T_p,R*(t_e-t)\}, R*(t_h-t)\}-O_i(t) \quad (EQ\ 3)$$

where $a_i$ is the bandwidth weighting factor for bitstream i, $T_p$ the partition interval as described previously, $t_e$ the time at which at least one of the buffers, which has equal priority to buffer i, has a packet ready to be sent, and R, $t_h$ and $O_i(t)$ are the same as those defined for EQ.2. The first term $a_i*R*T_p$ in EQ. 3 is the bandwidth allocated to source i during the partition interval $T_p$. Inclusion of the second term $R*(t_e-t)$ in EQ. 3 allows the current packet size to be extended beyond what has been allocated to it until at least one of the other buffers, which has equal priority to buffer i, has a packet to be sent. Inclusion of the third term $R*(t_h-t)$ in EQ. 3 allows transmission of the current packet to be interrupted by a packet-transmission request from a higher priority buffer, where a buffer sends out its packet-transmission request as soon as it stores one packet worth of bits.

In some applications, a packet must contain an integer number of bytes, so the size $S_i(t)$ is selected to ensure that the total packet length contains an integer number of bytes.

Where none of the buffers has a packet ready to be sent, i.e., $S_i(t)=0$ for all i, a form of padding packets such as HDLC flags, which may also be of an integer number bytes, are typically be sent to the channel.

Figure 6:
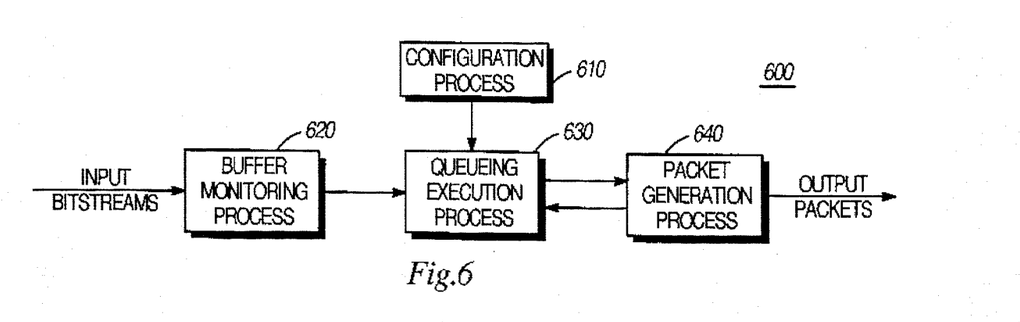
FIG. 6 is a flow chart illustrating steps that describe the high-level processes and control flow in the multimedia multiplexing device in accordance with the present invention.

FIG. 6, numeral 600, is a flow chart describing the high-level processes and control flow implemented in the multimedia multiplexing device in accordance with the present invention. In FIG. 6, the configuration process (610) performs priority assignment, bandwidth allocation, and selection of a queuing discipline based on the priority assignment as described above. This process is typically executed at the beginning of a communication upon receipt of bitstreams, but it can also be initiated during a communication if there is any change in either channel condition or information sources. The buffer monitoring process (620) monitors a set of information buffers which receive the input source bitstreams, and generates a packet-transmission request for any buffer which has at least one packet's worth of bits ready to be sent. The queuing execution process (630) selects and segments bitstreams to be sent at different times based on a queuing discipline determined by the configuration process (610), packet-transmission requests determined by the buffer monitoring process (620), and packet sending indication determined by the packet generation process (640). Finally, the packet generation process (640) performs packetization by forming packets based on a selected protocol and inserting stuffing bits into packets, and then output packets to an output channel.

The buffer monitoring process (620) is more efficiently accomplished by monitoring at small, regular, predetermined intervals. Using small versus large intervals decreases the potential delay of a high priority packet, but increases the processing burden on the processor.

The frequency at which the buffer monitoring (620) is called may be reduced, and hence the processing burden, by scheduling a calling time based on the size of a data block being currently sent if it is known.

In the following example, an implementation based on HDLC framing structure and three different media types are used:

audio—having priority $P_1$
video—having priority $P_2$
data—having priority $P_3$ where $P_1>P_2>P_3$. Since audio has the highest priority, the goal is to preempt all others when an audio packet is ready to be sent. The remaining bandwidth is first allocated to video, and then finally to data.

The process begins when the first encoded audio frame is ready to be sent. The following steps of operation are then conducted:

A) An audio packet is formed based on a selected protocol, HDLC encoded, and then is output to the output channel.

B) The processor is programmed to schedule the next instance of the buffer monitoring (620), just prior to the current packet being completely transmitted to the output channel. One method is to use a timer interrupt, which is typically available in microprocessors and digital signal processors.

C) When the next instance of (620) occurs, the available bandwidth is computed using EQ. 2, where $t_h$ is predictable because audio is typically formed at a deterministic periodic rate. At this instance, a video packet (or data packet if no video is available, or HDLC flags is neither is available) is formed based on a selected protocol, HDLC encoded and then is output, where the packet size is determined by EQ. 1.

D) If a next audio frame is still not ready, execute steps B) and C) again; otherwise go to step E).

E) repeat step A) to D).

With the above approach, since the buffer monitoring (620) is called just as the audio encoder has a packet available, audio does not incur any delay. In practice, the audio encoder may experience processing jitter because it may take different times to encode different audio frames. Thus, the audio encoder does not have an audio packet ready at each expected time. To alleviate this problem, the audio encoder may delay all its encoded audio frames by the maximum expected jitter prior to forwarding them to the multiplexer. This ensures that an audio packet is always avaiable at time $K*t_h$, where K is an integer, assuming that silence suppression is not used. In this simplified approach, video will not be able to immediately interrupt a data packet if the data packet was being sent prior to a video packet being ready. However, the maximum data packet size may be selected to be reasonably small so that video will not be blocked longer than a predetermined time.

The overhead $O_i(t)$ given in EQ. 2 and EQ. 3 typically includes a packet header, stuffing bits and flags, where the number of bits used for the header is typically fixed. When HDLC framing is used to delineate packets, a single-byte binary word of "01111110" is used for the delineation flag. To avoid duplication of this HDLC flag in the information bitstream, HDLC bit-stuffing is applied to the content of each packet by inserting a "0' bit following every five consecutive "1" bits. The overhead caused by the bit-stuffing is approximately 1.6% for a random sequence, and up to 20% if the raw data sequence contains all "1's". If this overhead is not appropriately accounted for, and adjusted from the available bandwidth ($O_i(t)$ in EQ. 2 and EQ. 3), all traffic will eventually experience cummulative delay. However, by accurately estimating the amount of HDLC overhead and reducing the available bandwidth (i.e packet size), of the non-real-time traffic, the delay-sensitive real-time traffic will not be unnecessarily delayed.

For software implementations of HDLC bit-stuffing, the amount of stuffed bits is readily available to the queuing execution process, and hence the overhead $O_i(t)$ is easily determined. However, when a hardware HDLC controller is used, the bit-stuffing process is concealed from the user, so the amount of stuffed bits is not directly available, and must be estimated.

The flags and stuffing bits for a packet are generated by a hardware HDLC controller, and the available bandwidth $B_i(t,t_{itp})$ is estimated as the channel bit-rate multiplied by the buffer serving time, $t-t_{itp}$, and then is subtracted by the overhead corrections due to an underestimate of overhead of packets sent previously, where a correction for a packet is computed as T*R-S, where: A) T represents a time difference between an acknowledgment to the packet and that of an immediately preceeding packet, where the acknowledgment is typically generated by the HDLC controller upon completing transmission of each packet; B) R represents the channel bit-rate; and C) S represents the number of known information bits in the packet, such as the raw information bit, flags and packet header.

Figure 7:
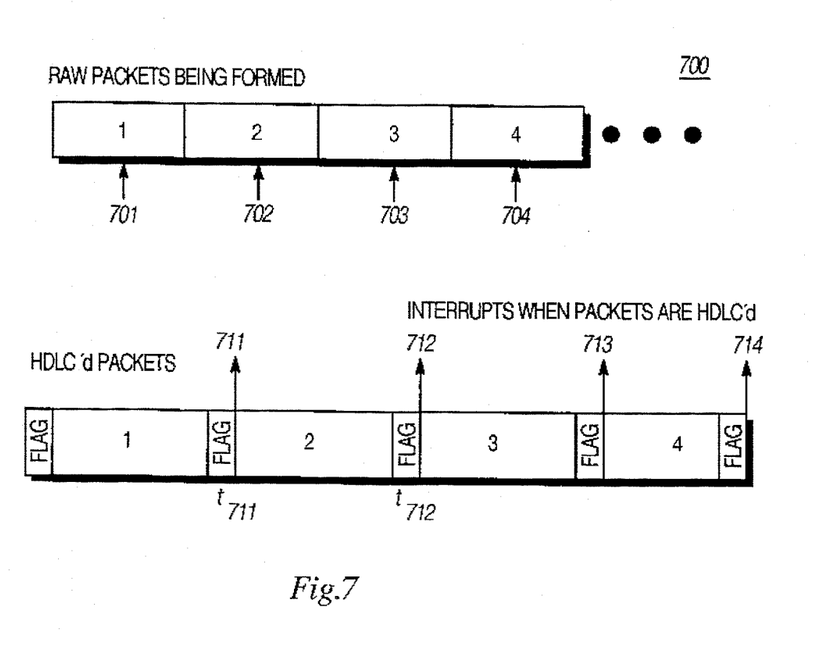
FIG. 7 is a diagram showing pre-HDLC packets, and the interrupts associated with those packets after HDLC encoding.

Present hardware HDLC controllers are capable of providing an interrupt whenever a buffer has been entirely HDLC encoded and sent to the transmit FIFO, as well as being able to specify insertion of an HDLC flag to terminate a packet. These features can be utilized to estimate the bit-stuffing overhead for that buffer. FIG. 7, numeral 700, shows an example of raw, i.e., pre-HDLC, packets being formed (701), (702), (703), (704), and then HDLC encoded. After each packet has been HDLC encoded, an interrupt is generated by the hardware controller (711), (712), (713), (714). The time interval between any two consecutive interrupts, multiplied by the output bit rate, equals the total number of HDLC encoded bits transmitted in the interval between the interrupts. This computation includes bit-stuffing, and possibly a flag if the buffer contained an end-of-packet. Since the size of the corresponding pre-HDLC encoded packet is known to the queuing execution process, the difference between the total number of HDLC encoded bits transmitted and the computed number of transmitted bits is the HDLC overhead. For example, $$\text{overhead for } 702 = (t_{712} - t_{711})*R - (\text{size of } 702) + \text{remaining fractional overhead}$$

where $t_{711}$, $t_{712}$ are the times at which the interrupts 711 and 712 occurs, respectively. In practice, there will be fractional parts resulting from each overhead computation. These must be continuously accumulated until the error surpasses an integer number of bits, and then compensated.

Depending on the latencies within the system, when the overhead for (702) is computed, the packet that is being formed may be (703), (704), or yet a later packet. In most implementations, the latency can typically be one packet. Shorter latency means that any HDLC overhead introduced in a packet can be quickly compensated by shortening the nontime-critical packets, so that delay for time-critical traffic is minimized. The packet size of the traffic is always selected as according to EQ. 1, 2, or 3.

The overhead estimate is recomputed for every block of data that is to be HDLC encoded and is used to adjust the size of the next packet to be multiplexed. Where the overhead is underestimated, then nontime-critical packets are larger than necessary, resulting in time-critical traffic incurring more delay. However, where the overhead is overestimated, then nontime-critical packets are smaller than necessary, resulting in more filler flags and reducing efficiency.

Figure 8:
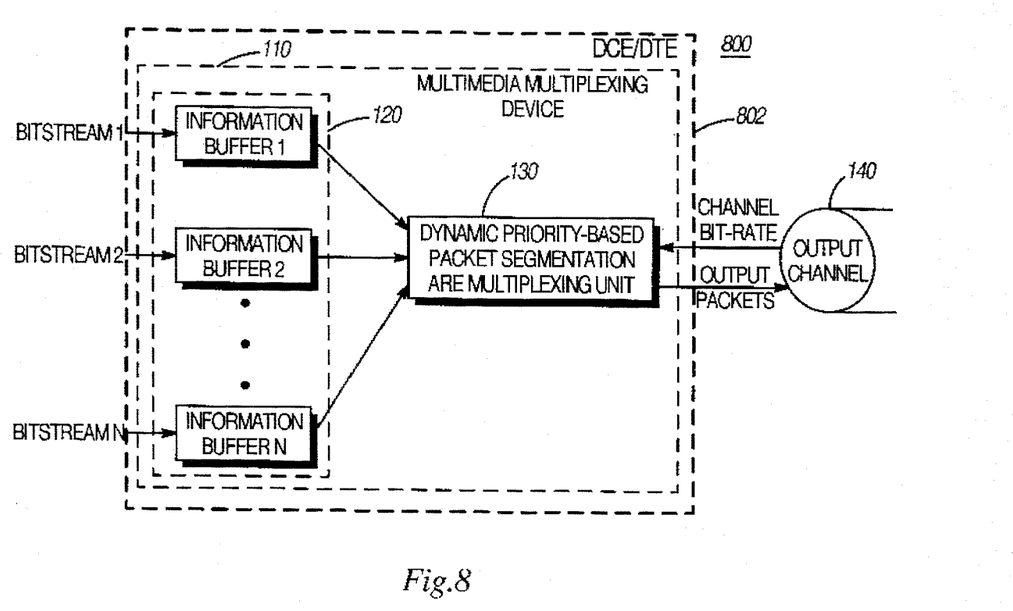
FIG. 8 is a block diagram showing one embodiment of Data Communications Equipment/Data Terminal Equipment having a multimedia multiplexing device in accordance with the present invention.

Clearly, the present invention may be implemented in numerous communication system devices. FIG. 8, numeral 800, is a block diagram showing one embodiment of Data Communications Equipment/Data Terminal Equipment (DCE/DTE) (802) having a multimedia multiplexing device in accordance with the present invention.

Figure 9:
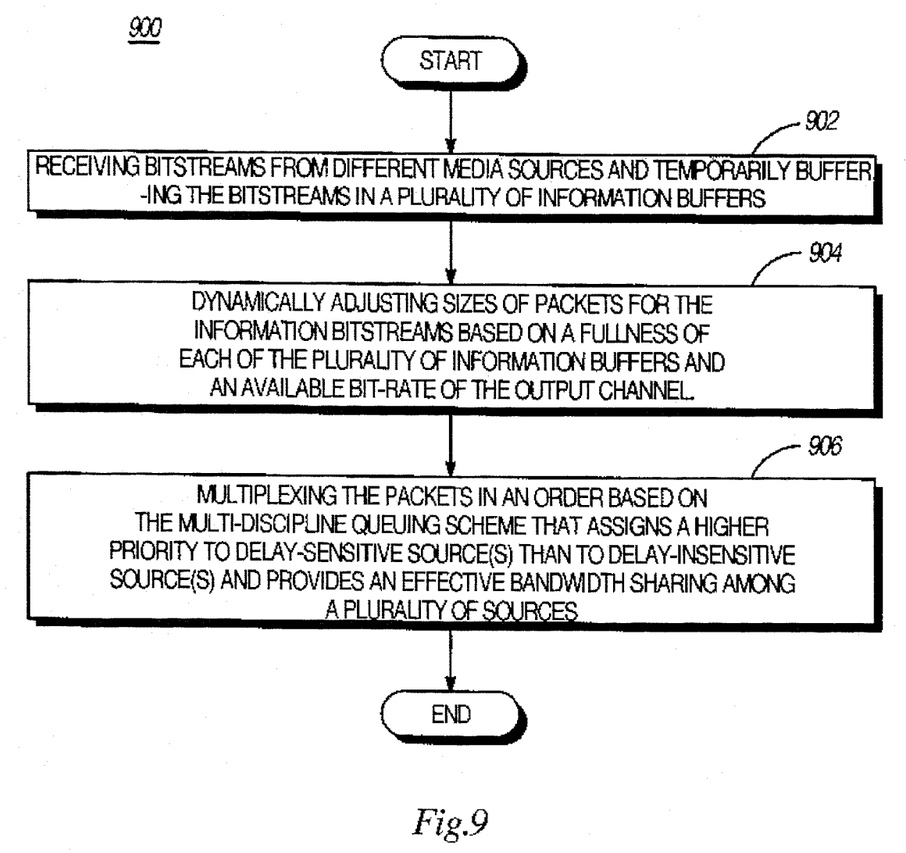
FIG. 9 is a flow chart showing one embodiment of steps in accordance with the method of the present invention.

In addition, the method of the present invention may, for example, be embodied as shown in FIG. 9, numeral 900. The method includes the steps of: A) receiving bitstreams from different media sources and temporarily buffering the bitstreams in a plurality of information buffers (902); and B) utilizing (904) a dynamic priority-based packet segmentation and multiplexing unit having a multi-discipline queuing scheme for: B1) dynamically adjusting sizes of packets for the information bitstreams based on a fullness of each of the plurality of information buffers and an available bit-rate of the output channel and B2) multiplexing the packets in an order based on the multi-discipline queuing scheme that assigns a higher priority to delay-sensitive source(s) than to delay-insensitive source(s) and provides an effective bandwidth sharing among a plurality of sources. Further implementation of the method proceeds as described above.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A multimedia multiplexing device in a multimedia communication system for segmenting and multiplexing bitstreams from different media sources into variable length packets, said device comprising:

A) a plurality of information buffers for receiving bitstreams from different media sources and temporarily buffering these bitstreams:

B) a dynamic priority-based packet segmentation and multiplexing unit having a multi-discipline queuing scheme. operably coupled to the plurality of information buffers and to an output channel, for selecting and segmenting information bitstreams into variable length packets, wherein a packet size is dynamically adjusted based at least on a fullness of each of the information buffers and a bit-rate of the output channel, and transmitting the packets to the output channel, wherein the dynamic priority-based packet segmentation and multiplexing unit having a multi-discipline queuing scheme comprises:

C) a buffer monitor, operably coupled to the plurality of information buffers, for monitoring the fullness of each information buffer and sending a packet-transmission request to a queuing and segmentation controller when an information buffer has one packet's worth of information bits ready to be sent;

D) the queuing and segmentation controller, operably coupled to the buffer monitor, to the output channel, and to a packet generator, for receiving packet-transmission request/requests from the buffer monitor, for receiving channel bit-rate information from the output channel, for receiving an end of packet indication from a packet generator, and for modifying a service buffer of a server in accordance with a selected queuing discipline;

E) the server, operably coupled to the queuing and segmentation controller and to the plurality of information buffers, for receiving a command from the queuing and segmentation controller and for receiving a bitstream from a selected information buffer and passing the selected bitstream to a packet generator; and F) the packet generator, operably coupled to receive a bitstream from the server, for forming packets and sending packets to the output channel and informing the queuing and segmentation controller each time a packet is sent.

2. The multimedia multiplexing device of claim 1 wherein the multi-discipline queuing scheme includes prioritizing bitstreams from different sources based on delay tolerances, where a least delay-tolerant bitstream is given the highest priority, a most delay-tolerant bitstream is given the lowest priority, and bitstreams that have an equal delay tolerance are given a same priority and are grouped into a single priority group.

3. The multimedia multiplexing device of claim 2 wherein a bandwidth-weighting factor $a_i$ for a bitstream i, i an index of the bitstream, is assigned for each bitstream as a fraction of bandwidth allocated to the bitstream i out of the total bandwidth allocated to the priority group containing bitstream i.

4. The multimedia multiplexing device of claim 1 wherein, in the multi-discipline queuing scheme, where there are N buffers, represented as $B_1, B_2, \ldots,$ and $B_N$, for storing source bitstream $1, 2, \ldots,$ and N respectively, a priority of each buffer is the same as the priority of the corresponding bitstream, the buffers are served according to one of A—C:
   A) a Head of Line Priority for Variable Length Packet Segmentation, HOLP-VLP, queuing discipline;
   B) a Weighted Round Robin for Variable Length Packet Segmentation, WRR-VLP, queuing discipline; and
   C) a predetermined combination of the HOLP-VLP and WRR-VLP queuing disciplines.

5. The multimedia multiplexing device of claim 4 wherein, the HOLP-VLP queuing discipline is utilized to treat priority groups that all have different priorities and includes the steps of:
   A) where buffer i, i an index of the buffer, is currently being served, continuing, by a server, to serve buffer i until one of the following two events happens:
      A1) at least one packet from a higher priority buffer is ready to be sent;
      A2) an insufficient number of bits are available in buffer i; and
   B) upon one of A1–A2 occuring, stopping serving buffer i, by the server, after completely sending a packet currently being sent and then switching to serve a next highest priority buffer that has packet/packets ready to be sent.

6. The multimedia multiplexing device of claim 4 wherein, the WRR-VLP queuing discipline is utilized to treat bitstreams that all have an equal priority and includes the steps of:
   A) serving, by the server, in a pre-selected partition period, $T_p$, each buffer in a same priority group cyclically in a predetermined order and for a period, $T_i$, i an index of the buffer, where the period $T_i$ is one of A1–A3:
      A1) $a_i*T_p$, where $a_i$ is the bandwidth-weighting factor used for bitstream i; and
      A2) shortening $T_i$ where one of A2a–A2b:
         A2a) where insufficient bits are in buffer i; and
         A2b) where a packet from a higher priority buffer is ready to be sent; and
      A3) extending $T_i$ where buffer i still has bits to be sent, but all other buffers in a same priority group are unready to send bits, where an upper bound of a partition period $T_p$ is determined by one of A3a–A3b:
         A3a) a predetermined maximum queuing delay requirement for each bitstream in the priority group and a lower bound of $T_p$ is determined by the packetization efficiency requirement; and
         A3b) $T_p$ is adjusted dynamically;
   where, when a particular buffer is allocated a period of $a_i*T_p$ to send a packet, but the packet is interrupted by a packet-transmission request from a higher priority buffer, then a remaining credit is given to the same buffer when the priority group is served again in a following time.

7. The multimedia multiplexing device of claim 4 wherein a packet from bitstream i and generated at time t contains a number of raw information bits denoted as $S_i(t)$, excluding packet header, flags and any stuffing bits, where $S_i(t)$ is computed as follows:

if $(Q_i(t) < S_i^{min})$ $S_i(t)=0$
else $$S_i(t) = \min \{S_i^{max}, Q_i(t) + Q_i(t_{itp}-t), B_i(t,t_{itp})\}$$

where $S_i^{min}$ and $S_i^{max}$, with $0 < S_i^{min} <= S_i^{max}$, are respectively a minimum and maximum number of raw information bits in a packet for bitstream i, $Q_i(t)$ a number of raw information bits available in buffer i at time t, $Q_i(t_{itp}-t)$ a number of raw information bits entering buffer i between time t and $t_{itp}$, and $B_i(t,t_{itp})$ a maximum number of bits, that can be sent during a time when said buffer is being continuously served, subtracted by any overhead bits, denoted $O_i(t)$, for the packet, where $t_{itp}$ is an interrupt time at which transmission of the current packet must be stopped, and, where selected, where a fixed number of information bits in each packet is sent, $S_i^{min}=S_i^{max}$.

8. The multimedia multiplexing device of claim 7 wherein the minimum and maximum number of raw information bits are pre-determined based on efficiency and memory requirements for a given application.

9. The multimedia multiplexing device of claim 7 wherein flags and stuffing bits for a packet are generated by a hardware HDLC controller, and the available bandwidth $B_i(t,t_{itp})$ is estimated as a channel bit-rate multiplied by a buffer serving time, $t-t_{itp}$, and then is subtracted by overhead corrections due to an underestimate of overhead of packets sent previously, where a correction for a packet is computed as $T*R-S$, where:
   A) T represents a time difference between an acknowledgment to the packet and that of an immediately preceeding packet;
   B) R represents the channel bit-rate; and
   C) S represents a number of known information bits in the packet.

10. A multimedia multiplexing device in a multimedia communication system for segmenting and multiplexing bitstreams from different media sources into variable length packets, said device comprising:
   A) a plurality of information buffers for receiving bitstreams from the different media sources and temporarily buffering the bitstreams:
   B) a dynamic priority-based packet segmentation and multiplexing unit having a multi-discipline queuing scheme, operably coupled to the plurality of information buffers and to an output channel, for:
      B1) dynamically adjusting sizes of packets for the bitstreams based on a fullness of each of the plurality of information buffers and an available bit-rate of the output channel: and
      B2) multiplexing the packets in an order based on the multi-discipline gueuing scheme that assigns a higher priority to delay-sensitive source/sources than to delay-insensitive source/sources and provides an effective bandwidth sharing among a plurality of sources, wherein the dynamic priority-based packet segmentation and multiplexing unit comprises:

C) a buffer monitor, operably coupled to the plurality of information buffers, for monitoring the fullness of each information buffer and sending a packet-transmission request to a queuing and segmentation controller when an information buffer has one packet worth of information bits ready to be sent;

D) the queuing and segmentation controller, operably coupled to the buffer monitor, to the output channel, and to a packet generator, for receiving packet-transmission request/requests from the buffer monitor, for receiving channel bit-rate information from the output channel, for receiving an end of packet indication from a packet generator, and for modifying a service buffer of a server in accordance with a selected queuing discipline;

E) the server, operably coupled to the queuing and segmentation controller and to the plurality of information buffers, for receiving a command from the queuing and segmentation controller and for receiving a bitstream from a selected information buffer and passing the selected bitstream to a packet generator; and F) the packet generator, operably coupled to receive a bitstream from the server, for forming packets and sending packets to the output channel and informing the queuing and segmentation controller each time a packet is sent.

11. The multimedia multiplexing device of claim 10 wherein the multi-discipline queuing scheme includes prioritizing bitstreams from different sources based on delay tolerances, where a least delay-tolerant bitstream is given the highest priority, a most delay-tolerant bitstream is given the lowest priority, and bitstreams that have an equal delay tolerance are given a same priority and are grouped into a single priority group.

12. The multimedia multiplexing device of claim 11 wherein a bandwidth-weighting factor $a_i$ for bitstream i, i an index of the bitstream, is assigned for each bitstream as a fraction of bandwidth allocated to the bitstream i out of the total bandwidth allocated to the priority group containing bitstream i.

13. The multimedia multiplexing device of claim 10 wherein, in the multi-discipline queuing scheme, where there are N buffers, represented as $B_1, B_2, \ldots,$ and $B_N$, for storing source bitstream $1, 2, \ldots,$ and N respectively, a priority of each buffer is the same as the priority of the corresponding bitstream, the buffers are served according to one of A–C:

A) a Head of Line Priority for Variable Length Packet Segmentation, HOLP-VLP, queuing discipline;

B) a Weighted Round Robin for Variable Length Packet Segmentation, WRR-VLP, queuing discipline; and C) a predetermined combination of the HOLP-VLP and WRR-VLP queuing disciplines.

14. The multimedia multiplexing device of claim 13 wherein, a HOLP-VLP queuing discipline is utilized to treat priority groups that all have different priorities and includes the steps of:

A) where buffer i, i an index of the buffer, is currently being served, continuing, by a server, to serve buffer i until one of the following two events happens:

A1) at least one packet from a higher priority buffer is ready to be sent;

A2) an insufficient number of bits are available in buffer i;

B) upon one of A1–A2 occuring, stopping serving buffer i, by the server, after completely sending a packet currently being sent and then switching to serve a next highest priority buffer that has packet/packets ready to be sent.

15. The multimedia multiplexing device of claim 13 wherein, a WRR-VLP queuing discipline is utilized to treat bitstreams that all have an equal priority and includes the steps:

A) serving, by the server, in a pre-selected partition period, $T_p$, each buffer in a same priority group cyclically in a predetermined order and for a period, $T_i$, i an index of the buffer, where the period $T_i$ is one of A1–A3:

A1) $a_i * T_p$, where $a_i$ is the bandwidth weighting factor used for bitstream i; and A2) shortening $T_i$ where one of A2a–A2b:
   A2a) where insufficient bits is in buffer i; and
   A2b) where a packet from a higher priority buffer is ready to be sent; and A3) extending $T_i$ where buffer i still has bits to be sent, but all other buffers in a same priority group are unready to send bits, where an upper bound of a partition period $T_p$ is determined by one of A3a–A3b:
   A3a) a predetermined maximum queuing delay requirement for each bitstream in the priority group and a lower bound of $T_p$ is determined by the packetization efficiency requirement; and
   A3b) $T_p$ is adjusted dynamically;

where, when a particular buffer is allocated a period of $a_i * T_p$ to send a packet, but the packet is interrupted by a packet-transmission request from a higher priority buffer, then a remaining credit is given to a same buffer when the priority group is served again in a following time.

16. The multimedia multiplexing device of claim 13 wherein a packet from bitstream i and generated at time t contains the number of raw information bits denoted as $S_i(t)$, excluding packet header, flags and any stuffing bits, where $S_i(t)$ is computed as follows:

$$\text{if } (Q_i(t) < S_i^{min})$$
$$S_i(t) = 0$$
$$\text{else}$$
$$S_i(t) = \min\{S_i^{max}, Q_i(t) + Q_i(t_{itp} - t), B_i(t, t_{itp})\}$$

where $S_i^{min}$ and $S_i^{max}$, with $0 < S_i^{min} <= S_i^{max}$, are respectively a minimum and maximum number of raw information bits in a packet for bitstream i, $Q_i(t)$ a number of raw information bits available in buffer i at time t, $Q_i(t_{itp}-t)$ a number of raw information bits entering buffer i between time t and $t_{itp}$, and $B_i(t,t_{itp})$ a maximum number of bits, that can be sent during a time when said buffer is being continuously served, subtracted by any overhead bits, denoted $O_i(t)$, for the packet, where $t_{itp}$ is the interrupt time at which transmission of the current packet must be stopped, and, where selected, where a fixed number of information bits in each packet is sent, $S_i^{min} = S_i^{max}$.

17. The multimedia multiplexing device of claim 16 wherein the minimum and maximum number of raw information bits are pre-determined based on efficiency and memory requirements for a given application.

18. The multimedia multiplexing device of claim 16 wherein flags and stuffing bits for a packet are generated by a hardware HDLC controller, and the available bandwidth $B_i(t,t_{itp})$ is estimated as a channel bit-rate multiplied by a buffer serving time, $t-t_{itp}$, and then is subtracted by overhead corrections due to an underestimate of overhead of packets sent previously, where a correction for a packet is computed as $T*R-S$, where:

A) T represents a time difference between an acknowledgment to the packet and that of an immediately preceeding packet;

B) R represents the channel bit-rate; and

C) S represents a number of known information bits in the packet.

19. A multimedia multiplexing method for a multimedia communication system for segmenting and multiplexing bitstreams from different media sources into variable length packets, said method comprising the steps of:

A) receiving bitstreams from different media sources and temporarily buffering the bitstreams in a plurality of information buffers;

B) dynamically adjusting, utilizing a dynamic priority-based packet segmentation and multiplexing unit, sizes of packets for the information bitstreams based on a fullness of each of the plurality of information buffers and an available bit-rate of the output channel and C) multiplexing, utilizing the dynamic priority-based packet segmentation and multiplexing unit, the packets in an order based on the multi-discipline gueuing scheme that assigns a higher priority to delay-sensitive source/sources than to delay-insensitive source/sources and provides an effective bandwidth sharing among a plurality of sources, wherein the dynamic priority-based packet segmentation and multiplexing unit having a multi-discipline queuing scheme utilizes the steps of:

D) monitoring, by a buffer monitor, the fullness of each information buffer and sending a packet-transmission request to a queuing and segmentation controller when an information buffer has one packet worth of information bits ready to be sent;

E) utilizing a queuing and segmentation controller for receiving packet transmission request/requests from the buffer monitor, for receiving channel bit-rate information from an output channel, for receiving an end of packet indication from a packet generator, and for modifying a service buffer of a server in accordance with a selected queuing discipline;

F) utilizing a server for receiving a command from the queuing and segmentation controller and for receiving a bitstream from a selected information buffer and passing the selected bitstream to a packet generator; and G) utilizing a packet generator for forming packets and sending the packets to the output channel and informing the queuing and segmentation controller each time a packet is sent.

20. The method of claim 19 wherein the multi-discipline queuing scheme includes prioritizing bitstreams from different sources based on delay tolerances, where a least delay-tolerant bitstream is given the highest priority, a most delay-tolerant bitstream is given the lowest priority, and bitstreams that have an equal delay tolerance are given a same priority and are grouped into a single priority group.

21. The method of claim 20 wherein a bandwidth-weighting factor $a_i$ for a bitstream i, i an index of the bitstream, is assigned for each bitstream as a fraction of bandwidth allocated to the bitstream i out of the total bandwidth allocated to the priority group containing bitstream i.

22. The method of claim 19 wherein, in the multi-discipline queuing scheme, where there are N buffers, represented as $B_1, B_2, \ldots,$ and $B_N$, for storing source bitstream 1, 2, ..., and N respectively, a priority of each buffer is the same as the priority of the corresponding bitstream, the buffers are served according to one of A–C:

A) a Head of Line Priority for Variable Length Packet Segmentation, HOLP-VLP, queuing discipline;

B) a Weighted Round Robin for Variable Length Packet Segmentation, WRR-VLP, queuing discipline; and C) a predeterimined combination of the HOLP-VLP and WRR-VLP queuing disciplines.

23. The method of claim 22 wherein the HOLP-VLP queuing discipline is utilized to treat priority groups that all have different priorities and includes the steps:

A) where buffer i, i an index of the buffer, is currently being served, continuing, by a server, to serve buffer i until one of the following two events happens:

A1) at least one packet from a higher priority buffer is ready to be sent;

A2) an insufficient number of bits are available in buffer i;

B) upon one of the events occuring, stopping serving buffer i, by the server, after completely sending a packet currently being sent and then switching to serve a next highest priority buffer that has packet/packets ready to be sent.

24. The method of claim 22 wherein, the WRR-VLP queuing discipline is utilized to treat bitstreams that all have an equal priority and includes the steps:

A) serving, by the server, in a pre-selected partition period, $T_p$, each buffer in a same priority group cyclically in a predetermined order and for a period, $T_i$, i an index of the buffer, where the period $T_i$ is one of A1–A3:

A1) $a_i*T_p$, where $a_i$ is the bandwidth weighting factor used for bitstream i; and A2) shortening $T_i$ where one of A2a–A2b:

A2a) where insufficient bits are in buffer i; and

A2b) where a packet from a higher priority buffer is ready to be sent; and

A3) extending $T_i$ where buffer i still has bits to be sent, but all other buffers in a same priority group are unready to send bits, where an upper bound of a partition period $T_p$ is determined by one of A3a–A3b:

A3a) a predetermined maximum queuing delay requirement for each bitstream in the priority group and a lower bound of $T_p$ is determined by the packetization efficiency requirement; and A3b) $T_p$ is adjusted dynamically;

where, when a particular buffer is allocated a period of $a_i*T_p$ to send a packet, but the packet is interrupted by a packet-transmission request from a higher priority buffer, then the remaining credit is given to the same buffer when the priority group is served again in a following time.

25. The method of claim 22 wherein a packet from bitstream i and generated at time t contains a number of raw information bits denoted as $S_i(t)$, excluding packet header, flags and any stuffing bits, where $S_i(t)$ is computed as follows:

if $(Q_i(t) < S_i^{min})$ $S_i(t)=0$ else $$S_i(t) = \min\{S_i^{max}, Q_i(t) + Q_i(t_{itp}-t), B_i(t,t_{itp})\}$$

where $S_i^{min}$ and $S_i^{max}$, with $0 < S_i^{min} <= S_i^{max}$, are respectively a minimum and maximum number of raw information bits in a packet for bitstream i, $Q_i(t)$ number of raw information bits available in buffer i at time t, $Q_i(t_{itp}-t)$ a number of raw information bits entering buffer i between time t and $t_{itp}$, and $B_i(t,t_{itp})$ a maximum number of bits, that can be sent during a time when said buffer is being continuously served, subtracted by any overhead bits, denoted $O_i(t)$, for the packet, where $t_{itp}$ is the interrupt time at which transmission of the current packet must be stopped, and, where selected, where a fixed number of information bits in each packet is sent, $S_i^{min}=S_i^{max}$.

26. The multimedia multiplexing device of claim 25 wherein the minimum and maximum number of raw information bits are pre-determined based on efficiency and memory requirements for a given application.

27. The multimedia multiplexing device of claim 25 wherein flags and stuffing bits for a packet are generated by a hardware HDLC controller, and the available bandwidth $B_i(t,t_{itp})$ is estimated as a channel bit-rate multiplied by a buffer serving time, $t-t_{itp}$, and then is subtracted by the overhead corrections due to an underestimate of overhead of packets sent previously, where a correction for a packet is computed as T*R-S, where:

A) T represents a time difference between an acknowledgment to the packet and that of an immediately preceeding packet;
    B) R represents the channel bit-rate; and
    C) S represents a number of known information bits in the packet.

28. The method of claim 22 wherein the multi-discipline queuing scheme includes, where a real-time audio bitstream, denoted as bitstream 1, a real-time video bitstream, denoted as bitstream 2, a real-time data bitstream, denoted as bitstream 3, and a non-real-time data bitstream, denoted as a bitstream 4, are multiplexed together, making priority assignments with $P_1>P_2=P_3>P_4$, where $P_i$ is a priority associated with bitstream i, and i=1, 2, 3, 4, assigning bitstream 2 and 3 in a same priority group, denoted as PG2, that are multiplexed according to the WRR-VLP queuing discipline, and then multiplexing bitstream 1, PG2, and bitstream 4 according to the HOLP-VLP queuing discipline.

29. Data Communications Equipment/Data Terminal Equipment having a multimedia multiplexing device in a multimedia communication system for segmenting and multiplexing bitstreams from different media sources into variable length packets, said multimedia multiplexing device comprising:

A) a plurality of information buffers for receiving bitstreams from the different media sources and temporarily buffering the bitstreams:
    B) a dynamic priority-based packet segmentation and multiplexing unit having a multi-discipline queuing scheme, operably coupled to the plurality of information buffers and to an output channel, for:
        B1) dynamically adjusting sizes of packets for the bitstreams based on a fullness of each of the plurality of information buffers and an available bit-rate of the output channel: and
        B2) multiplexing the packets in an order based on the multi-discipline queuing scheme that assigns a higher priority to delay-sensitive source/sources than to delay-insensitive source/sources and provides an effective bandwidth sharing among a plurality of sources,
    wherein the dynamic priority-based packet segmentation and multiplexing unit comprises:
        A) a buffer monitor, operably coupled to the plurality of information buffers, for monitoring the fullness of each information buffer and sending a packet-transmission request to a queuing and segmentation controller when an information buffer has one packet worth of information bits ready to be sent;
        B) the queuing and segmentation controller, operably coupled to the buffer monitor, to the output channel, and to a packet generator, for receiving packet-transmission request/requests from the buffer monitor, for receiving channel bit-rate information from the output channel, for receiving an end of packet indication from a packet generator, and for modifying a service buffer of a server in accordance with a selected queuing discipline;
        C) the server, operably coupled to the queuing and segmentation controller and to the plurality of information buffers, for receiving a command from the queuing and segmentation controller and for receiving a bitstream from a selected information buffer and passing the selected bitstream to a packet generator; and
        D) the packet generator, operably coupled to receive a bitstream from the server, for forming packets and sending packets to the output channel and informing the queuing and segmentation controller each time a packet is sent.

30. The Data Communications Equipment/Data Terminal Equipment of claim 29 wherein the multi-discipline queuing scheme includes prioritizing bitstreams from different sources based on delay tolerances, where a least delay-tolerant bitstream is given the highest priority, a most delay-tolerant bitstream is given the lowest priority, and bitstreams that have an equal delay tolerance are given a same priority and are grouped into a single priority group.

31. The Data Communications Equipment/Data Terminal Equipment of claim 30 wherein a bandwidth-weighting factor $a_i$ for bitstream i, i an index of the bitstream, is assigned for each bitstream as a fraction of bandwidth allocated to the bitstream i out of the total bandwidth allocated to the priority group containing bitstream i.

32. The Data Communications Equipment/Data Terminal Equipment of claim 29 wherein, in the multi-discipline queuing scheme, where there are N buffers, represented as $B_1, B_2, \ldots,$ and $B_N$, for storing source bitstream 1, 2, $\ldots$, and N respectively, a priority of each buffer is the same as the priority of the corresponding bitstream, the buffers are served according to one of A–C:

A) a Head of Line Priority for Variable Length Packet Segmentation, HOLP-VLP, queuing discipline;
    B) a Weighted Round Robin for Variable Length Packet Segmentation, WRR-VLP, queuing discipline; and
    C) a predetermined combination of the HOLP-VLP and WRR-VLP queuing disciplines.

33. The Data Communications Equipment/Data Terminal Equipment of claim 32 wherein, the HOLP-VLP queuing discipline is utilized to treat priority groups that all have different priorities and includes the steps of:

A) where buffer i, i an index of the buffer, is currently being served, continuing, by a server, to serve buffer i until one of the following two events happens:
        A1) at least one packet from a higher priority buffer is ready to be sent;
        A2) an insufficient number of bits are available in buffer i;
    B) upon one of A1–A2 occuring, stopping serving buffer i, by the server, after completely sending a packet currently being sent and then switching to serve a next highest priority buffer that has packet/packets ready to be sent.

34. The Data Communications Equipment/Data Terminal Equipment of claim 32 wherein, the WRR-VLP queuing discipline is utilized to treat bitstreams that all have an equal priority and includes the steps:

A) serving, by the server, in a pre-selected partition period, $T_p$, each buffer in a same priority group cyclically in a predetermined order and for a period, $T_i$, i an index of the buffer, where the period $T_i$ is one of A1–A3:

A1) $a_i*T_p$, where $a_i$ is the bandwidth weighting factor used for bitstream i; and A2) shortening $T_i$ where one of A2a–A2b:
   A2a) where insufficient bits is in buffer i; and
   A2b) where a packet from a higher priority buffer is ready to be sent; and A3) extending $T_i$ where buffer i still has bits to be sent, but all other buffers in a same priority group are unready to send bits, where an upper bound of a partition period $T_p$ is determined by one of A3a–A3b:
   A3a) a predetermined maximum queuing delay requirement for each bitstream in the priority group and a lower bound of $T_p$ is determined by the packetization efficiency requirement; and
   A3b) $T_p$ is adjusted dynamically;

where, when a particular buffer is allocated a period of $a_i*T_p$ to send a packet, but the packet is interrupted by a packet-transmission request from a higher priority buffer, then a remaining credit is given to a same buffer when the priority group is served again in a following time.

35. The Data Communications Equipment/Data Terminal Equipment of claim 32 wherein a packet from bitstream i and generated at time t contains the number of raw information bits denoted as $S_i(t)$, excluding packet header, flags and any stuffing bits, where $S_i(t)$ is computed as follows:

if $(Q_i(t)<S_i^{min})$ $S_i(t)=0$ else $$S_i(t)=\min \{S_i^{max}, Q_i(t)+Q_i(t_{itp}-t), B_i(t,t_{itp})\}$$

where $S_i^{min}$ and $S_i^{max}$, with $0<S_i^{min}<=S_i^{max}$, are respectively a minimum and maximum number of raw information bits in a packet for bitstream i, $Q_i(t)$ a number of raw information bits available in buffer i at time t, $Q_i(t_{itp}-t)$ a number of raw information bits entering buffer i between time t and $t_{itp}$, and $B_i(t,t_{itp})$ a maximum number of bits, that can be sent during a time when said buffer is being continuously served, subtracted by any overhead bits, denoted $O_i(t)$, for the packet, where $t_{itp}$ is the interrupt time at which transmission of the current packet must be stopped, and, where selected, where a fixed number of information bits in each packet is sent, $S_i^{min}=S_i^{max}$.

36. The Data Communications Equipment/Data Terminal Equipment of claim 35 wherein the minimum and maximum number of raw information bits are pre-determined based on efficiency and memory requirements for a given application.

37. The Data Communications Equipment/Data Terminal Equipment of claim 35 wherein flags and stuffing bits for a packet are generated by a hardware HDLC controller, and the available bandwidth $B_i(t,t_{itp})$ is estimated as a channel bit-rate multiplied by a buffer serving time, $t-t_{itp}$, and then is subtracted by the overhead corrections due to an under-estimate of overhead of packets sent previously, where a correction for a packet is computed as T*R-S, where:

A) T represents a time difference between an acknowledgment to the packet and that of an immediately preceeding packet;

B) R represents the channel bit-rate; and

C) S represents a number of known information bits in the packet.

* * * * *